Sept. 29, 1942.  W. OWEN  2,297,315
APPARATUS TO PRODUCE BENT GLASS
Filed March 28, 1941  3 Sheets-Sheet 1
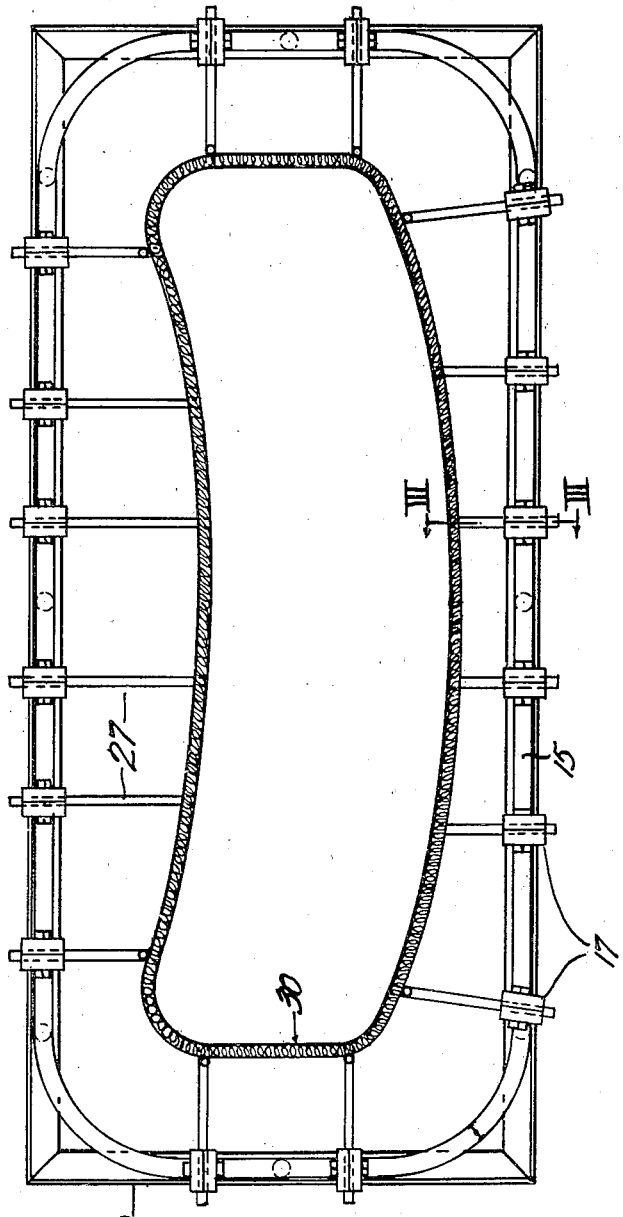
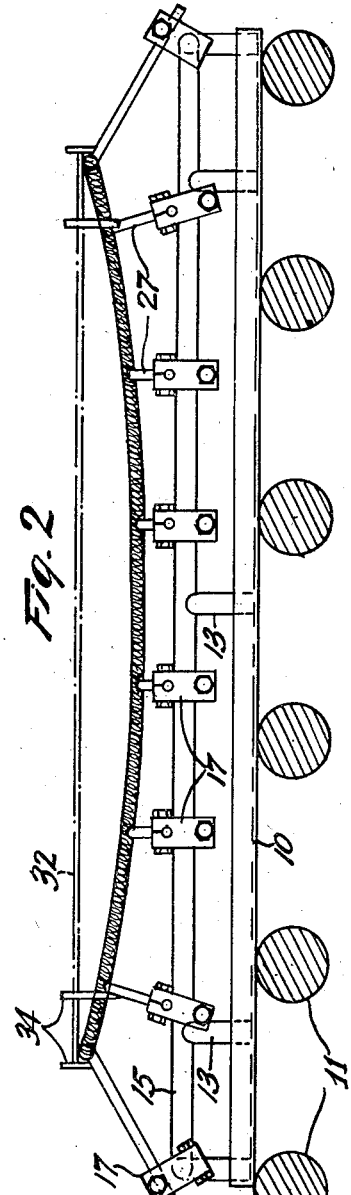
Inventor
WILLIAM OWEN
By Olen E. Bee
Attorney Sept. 29, 1942.    W. OWEN    2,297,315
APPARATUS TO PRODUCE BENT GLASS
Filed March 28, 1941    3 Sheets-Sheet 2
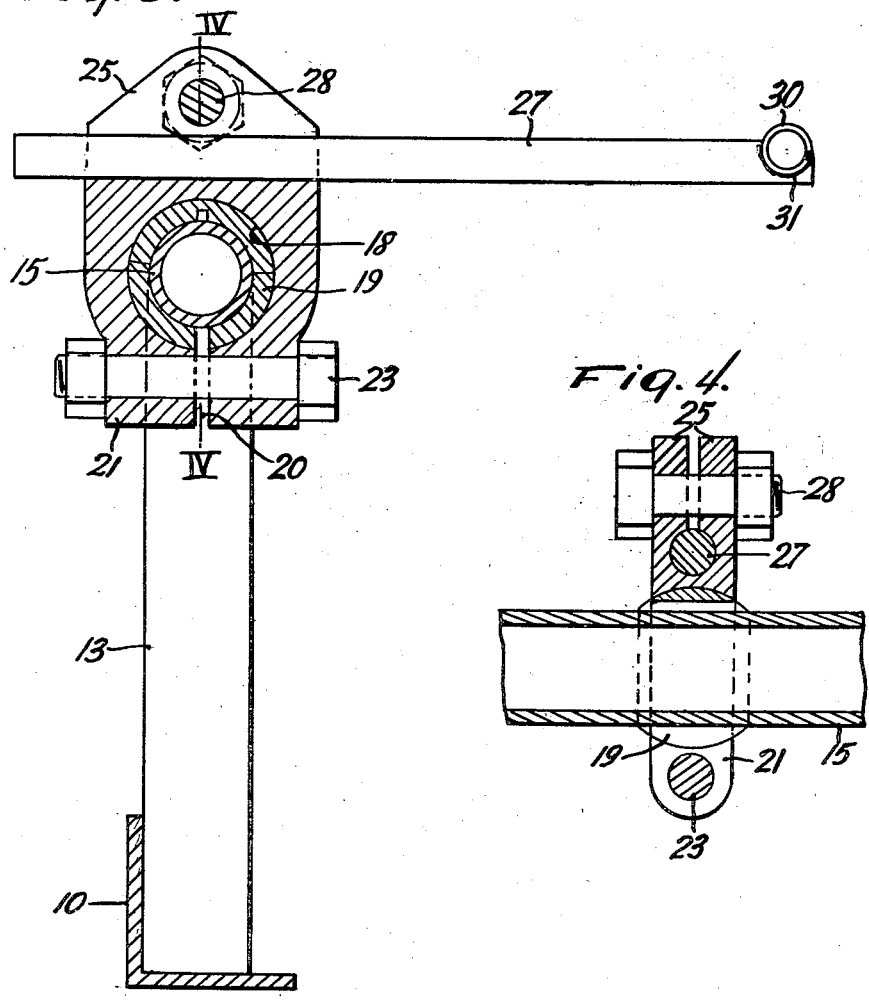
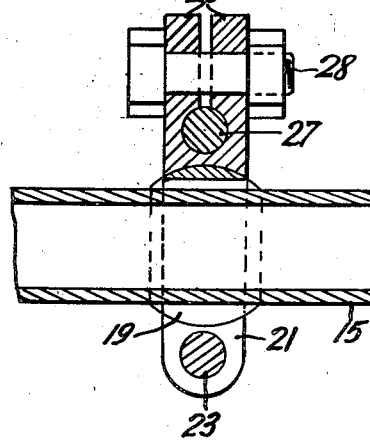
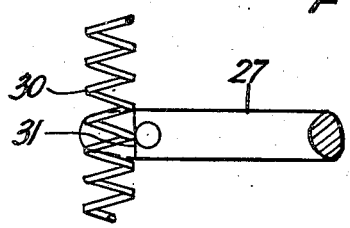
Inventor
WILLIAM OWEN
By Olen E. Bee
Attorney Sept. 29, 1942.  W. OWEN  2,297,315
APPARATUS TO PRODUCE BENT GLASS
Filed March 28, 1941  3 Sheets-Sheet 3
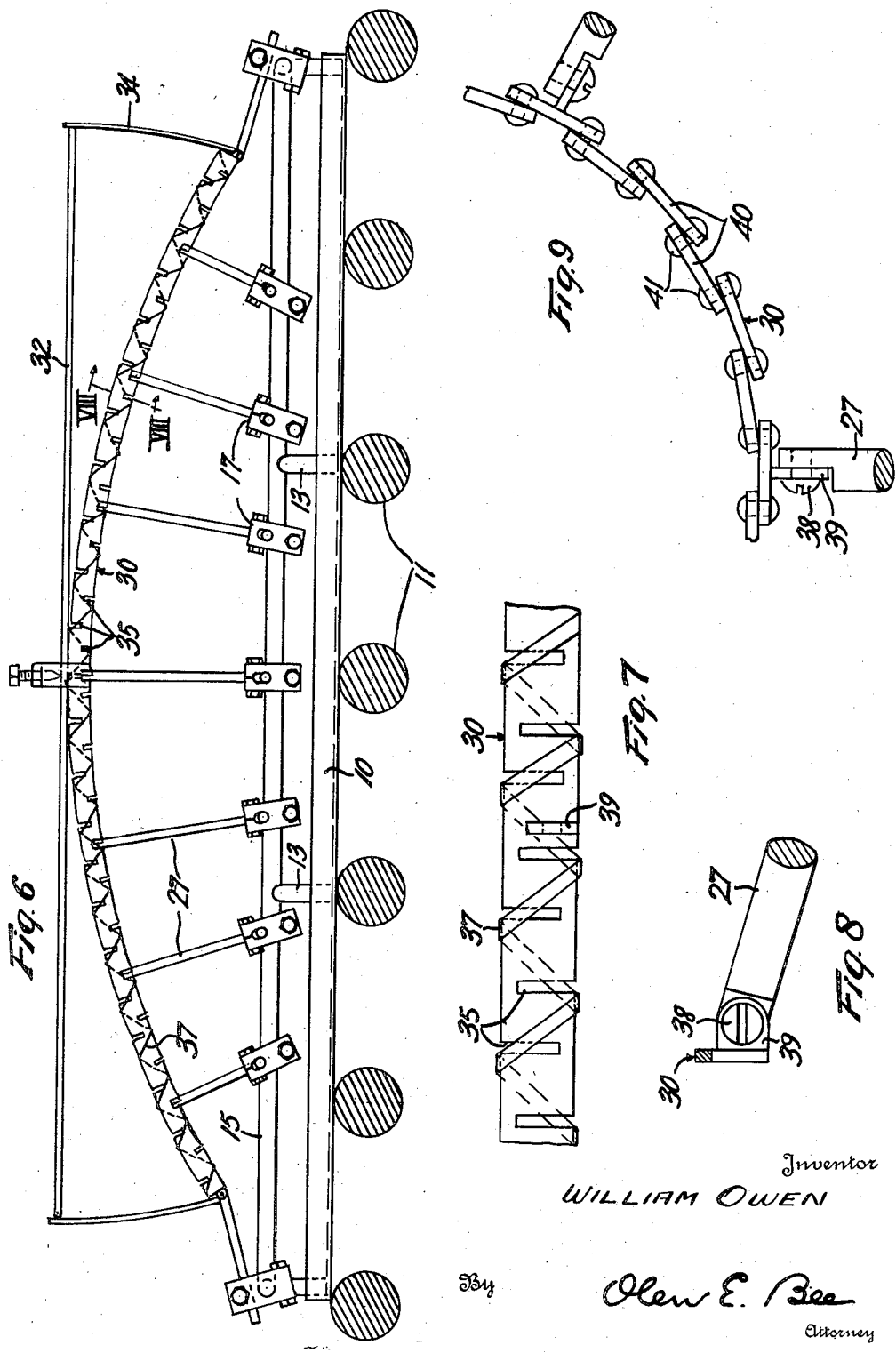
Inventor
WILLIAM OWEN
By Olen E. Bee
Attorney Patented Sept. 29, 1942

2,297,315

UNITED STATES PATENT OFFICE 2,297,315

APPARATUS TO PRODUCE BENT GLASS

William Owen, Pittsburgh, Pa., assignor to Pittsburgh Plate Glass Company, Allegheny County, Pa., a corporation of Pennsylvania Application March 28, 1941, Serial No. 385,665

11 Claims. (Cl. 49—67)

This invention relates to devices for supporting sheet glass during the bending thereof and it has particular relation to frame structure of such flexibility as to be adaptable for bending glass to various configurations.

One object of the invention is to provide an improved supporting frame to carry glass which is to be bent thereon under conditions of heating and influence of gravity.

Another object of the invention is to provide an improved glass supporting frame of such flexibility and adjustability as to be capable of assuming various curvatures to which glass can be shaped.

Proposals have previously been made for bending glass upon so-called skeleton type of mold designed to engage marginal portions of sheet glass which sags or sinks under the influence of heat and its weight to conform to the shape of the upper edges of the mold. The invention herein described is directed to a construction of skeleton mold which has all of the attributes of strength and proper mode of operation during the treatment of the glass and at the same time is inherently flexible and adjustable under certain conditions. However, the mold is sufficiently strong to withstand the weight of glass and is flexible only under the application of force greater than such weight.

In one form of the invention a flexible endless member is supported at intervals by means of arms which are adjustable to various heights and can be moved to force the flexible member into whatever shape desired. The glass is placed horizontally on the frame and upon applying heat of sufficient intensity to soften the glass, the latter sinks into the form defined by the flexible member. This bending action is in conformity with the general method of operation described in copending application of Henry J. Galey, Serial No. 314,071, filed January 16, 1940.

In the drawings:

Fig. 1 is a plan of a skeleton mold designed according to the invention; Fig. 2 is a side elevation of the mold, and in addition, portions of a conveyor system for supporting the mold are shown in cross section; Fig. 3 is a cross section, on a larger scale, taken substantially along the line III—III of Fig. 1; Fig. 4 is a cross section taken substantially along the line IV—IV of Fig. 3; Fig. 5 is a fragmentary plan showing in detail a skeleton mold portion and its support; Fig. 6 is a side elevation of another form of skeleton mold, together with portions of a conveyor system shown in cross section; Fig. 7 is a fragmentary side elevation of a portion of a flexible mold; Fig. 8 is a fragmentary cross section on a larger scale taken substantially along the line VIII—VIII of Fig. 6; and Fig. 9 is a fragmentary plan of another form of mold structure.

Referring to Figs. 1 to 5, a base frame 10 of rectangular form is designed to be rolled horizontally upon a roller conveyor system 11 and is provided with upwardly extending studs 13 which rigidly carry at their upper ends a horizontal frame 15 composed of a tubular frame element. In one form of structure the tubular element can be composed of heat resisting metal and can be bent to conform generally to the shape of the supporting frame 10. A series of clamping blocks 17 are arranged in spaced relation around the extent of the tubular frame 15 and are slid thereon before the tubular element is bent and before the mounting thereof upon the studs 13.

Each block 17 has a spherical socket 18 (Fig. 3) in which a sectional ring provided with an outer spherical surface is fitted, and the ring encircles the tubular element 15 to form with the block a universal joint. The lower end portion of each block is split, as indicated at 20, to form two downwardly extending resilient legs 21 which are provided with bolts 23 extending therethrough to be tightened to secure the block firmly around the sectional ring and tubular element. The upper portion of each clamping block 17 is also split to form resilient flanges 25 between which an arm 27 is clamped by means of a bolt 28 extending through the flanges.

Each arm 27 extends inwardly and its inner end portion can be adjusted upwardly or downwardly or otherwise about the universal joint while the arm can also be extended or retracted longitudinally by loosening the bolts 28 and adjusting the arm as desired.

The inner ends of the arms 27 carry an endless flexible band 30 which can be in the form of a metal member helically coiled to resemble a coil spring. Each of the arms has a recess 31 at its inwardly extended end where it is welded or otherwise rigidly secured to the band. The helical band 30 is sufficiently strong to support without sagging sheet glass units 32 to be bent to curvatures defined by the band. Certain of the arms are provided with upright guides 34 rigidly connected thereto for the purpose of properly centering the glass carried thereon.

In the form of skeleton frame shown in Fig. 6, the structure presented corresponds to that previously described with the exception that the band 30 is in the form of a metal tape or strip arranged on its edge, that is, its opposite edges are in substantially vertical planes. The band is provided with a series of notches or saw cuts 35 formed alternately from opposite edges thereof. If desirable, this band can be insulated from the glass supported thereon by means of a strand or strip 37 of asbestos or other heat resisting material as shown in Fig. 7. In this arrangement the ends of the arms 27 can be connected to the band by means of pivotal pins 38 extending through the ends of the arms and through ears 39 formed on the outer side of the band. The notches 35 provide for bending the band edgewise and the arms can be adjusted to produce the desired curvature to which the sheet glass carried thereon can be bent.

In the form of structure shown in Fig. 9, the endless band 30 is composed of a series of links 40 pivoted in end to end relation by means of suitable pins or rivets 41 which are relatively tightly secured although sufficiently flexible in their connection to be pivotable under predetermined pressure. The resistance to pivotable movement is sufficient to sustain the weight of the sheet glass 32 and the arms 27 can be adjusted as described above to shape the band according to the shape to which the glass is to be bent.

Although illustrative structure has been shown and described in detail, it will be apparent to those skilled in the art that the invention is not so limited but that various changes can be made therein without departing from the spirit of the invention or from the scope of the appended claims.

I claim:

1. A glass bending apparatus comprising a frame having side portions and end portions, a skeleton mold in the form of a substantially endless flexible band for supporting a glass plate horizontally, said mold having side portions and transverse end portions disposed in proximity to the side portions and end portions respectively of the frame, arms projecting from the frame to the side and end portions of the mold, and means for varying the effective length of the arms whereby they can support portions of said mold at different heights.

2. A glass bending apparatus comprising a frame having side portions and end portions, a skeleton mold in the form of a flexible helical band, said mold having side portions and transverse end portions disposed in proximity to the side portions and end portions respectively of the frame, arms projecting from the frame to the side and end portions of the mold and connected thereto, and means for varying the effective length of the arms whereby they can support portions of said mold at different heights.

3. A glass bending apparatus comprising a frame having side portions and end portions, a skeleton mold in the form of a substantially endless flexible metal strip, said mold having side portions and transverse end portions disposed in proximity to the side portions and end portions respectively of the frame, and arms projecting from the frame to the side and end portions of the mold to support portions of said mold at different heights.

4. A glass bending apparatus comprising a frame having side portions and end portions, a skeleton mold in the form of a flexible metal tape having notches therein from its opposite edges to render it flexible in edgewise relation, said mold having side portions and transverse end portions disposed in proximity to the side and end portions respectively of the frame, and arms projecting from the frame to the side and end portions of the mold and connected thereto to support portions of said mold at different heights.

5. A glass bending apparatus comprising a frame having side portions and end portions, a skeleton mold in the form of a substantially endless series of links secured together in end to end relation and frictionally resisting relative pivotal movement between links to such degree that the mold is adapted to support a glass plate without sagging, said mold having side portions and transverse end portions disposed in proximity to the side portions and end portions respectively of the frame, and arms projecting from the frame to the side and end portions of the mold and connected thereto to support portions of said mold at different heights.

6. A glass bending apparatus comprising a frame having side portions and end portions normally disposed in a substantially horizontal plane, a skeleton mold in the form of a flexible band, said mold having side portions and transverse end portions corresponding substantially to the side and end portions respectively of the frame and arranged in proximity thereto, and arms projecting from the frame and connected to the mold at various points about the perimeter thereof, said arms and frame having pivotal joints connecting them.

7. A glass bending apparatus comprising a frame having side portions and end portions normally disposed in a substantially horizontal position, a skeleton mold in the form of a flexible band, said mold having side portions and transverse end portions corresponding substantially to side portions and end portions respectively of the frame and arranged in proximity thereto, and axially extensible arms projecting from the frame and connected to the mold at various points about its perimeter, said arms and frame having universal joints connecting them.

8. A glass bending apparatus comprising a frame having side portions and end portions, a skeleton mold in the form of a flexible band, said mold having side portions and transverse end portions disposed in proximity to the side portions and end portions respectively of the frame, arms projecting from the frame to the side and end portions of the mold and connected thereto to support portions of said mold at different heights, and a strip of insulating material disposed about said flexible band to receive sheet glass thereon.

9. A glass bending apparatus comprising a frame having side portions and end portions, arms projecting inwardly from said frame and having pivotal connections securing them to said frame at intervals about the perimeter thereof, and means supported upon projecting end portions of said arms and defining a variable skeleton mold extending around the frame adjacent said side and end portions for supporting marginal portions of a glass plate thereon preparatory to the bending of the plate to the contour of said mold.

10. A glass bending apparatus comprising a frame having side portions and end portions, arms projecting inwardly from said frame and having pivotal connections securing them to said frame at intervals about the perimeter thereof, and means supported upon projecting end portions of said arms and defining a variable skeleton mold extending around the frame adjacent said side and end portions for supporting marginal portions of a glass plate thereon preparatory to the bending of the plate to the contour of said mold, said arms having means thereon for varying their effective length.

11. A glass bending apparatus comprising a frame having side portions and end portions, arms projecting inwardly from said frame and having universal joints securing them to said frame at intervals about the perimeter thereof, and means supported upon projecting end portions of said arms and defining a variable skeleton mold extending around the frame adjacent said side and end portions for supporting edges of a glass plate thereon preparatory to the bending of the plate to the contour of the mold.

WILLIAM OWEN.